United States Patent [19]

Sink

[11] 3,891,072
[45] June 24, 1975

[54] CLUTCH LEVER WITH LOW FRICTION PIVOT

[75] Inventors: William Howard Sink, Auburn; Richard Allen Flotow, Ft. Wayne, both of Ind.

[73] Assignee: Dana Corporation, Toledo, Ohio

[22] Filed: Sept. 5, 1973

[21] Appl. No.: 394,539

[52] U.S. Cl. ............................................. 192/99 A
[51] Int. Cl. ........................................... F16d 13/38
[58] Field of Search ............... 192/99 A, 70.29, 70.3

[56] References Cited
UNITED STATES PATENTS

| | | | |
|---|---|---|---|
| 2,583,621 | 1/1952 | Ziedler | 192/99 A |
| 2,920,731 | 1/1960 | Ziedler | 192/99 A X |
| 3,300,007 | 1/1967 | Motsch | 192/99 A X |
| 3,308,913 | 3/1967 | Montgomery | 192/99 A X |
| 3,417,844 | 12/1968 | Ziedler | 192/70.3 |
| 3,520,388 | 7/1970 | Sink | 192/70.29 |
| 3,653,475 | 4/1972 | Thelander | 192/99 A |

Primary Examiner—Benjamin W. Wyche
Attorney, Agent, or Firm—Robert E. Pollock

[57] ABSTRACT

A friction clutch of the spring loaded type is disclosed. The clutch comprises an improved lever assembly having fixed knife-edge pivot pins about which a plurality of clutch release levers operate to reduce friction during operation of the clutch between engaged and disengaged positions. The pivot pins and release levers include cooperating portions adapted to form restraining means which prevent the release levers from moving radially outwardly during operation of the clutch as a result of centrifugal forces.

5 Claims, 9 Drawing Figures

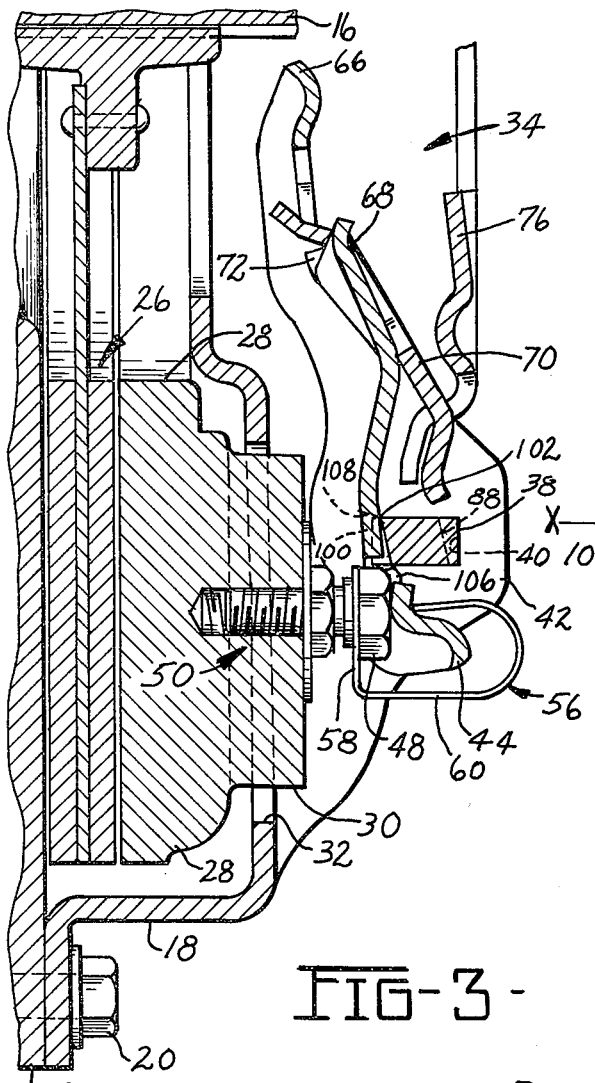
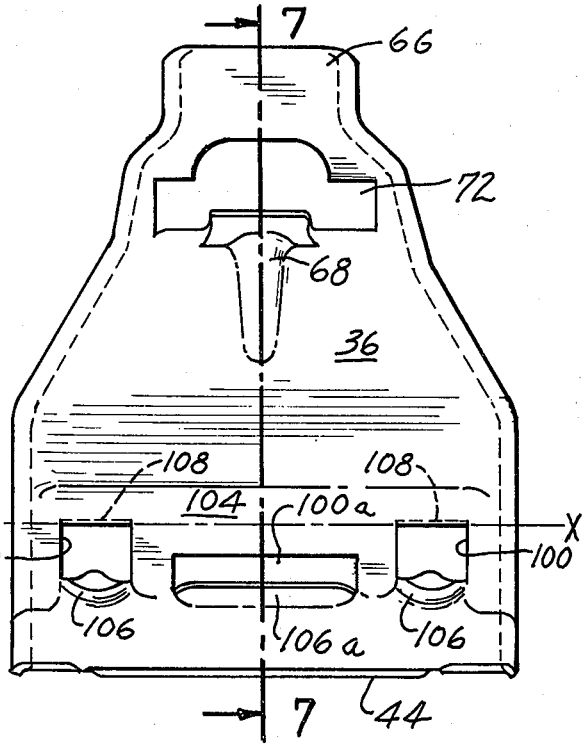
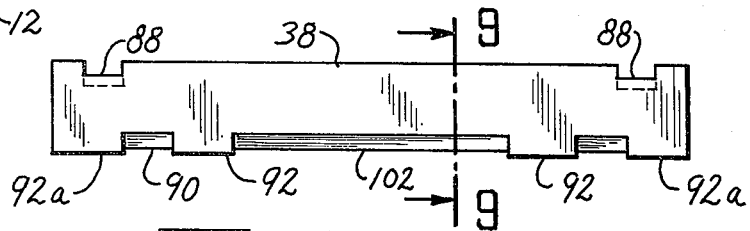
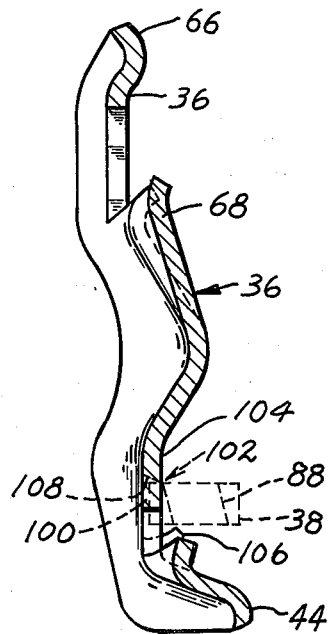
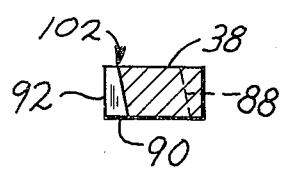

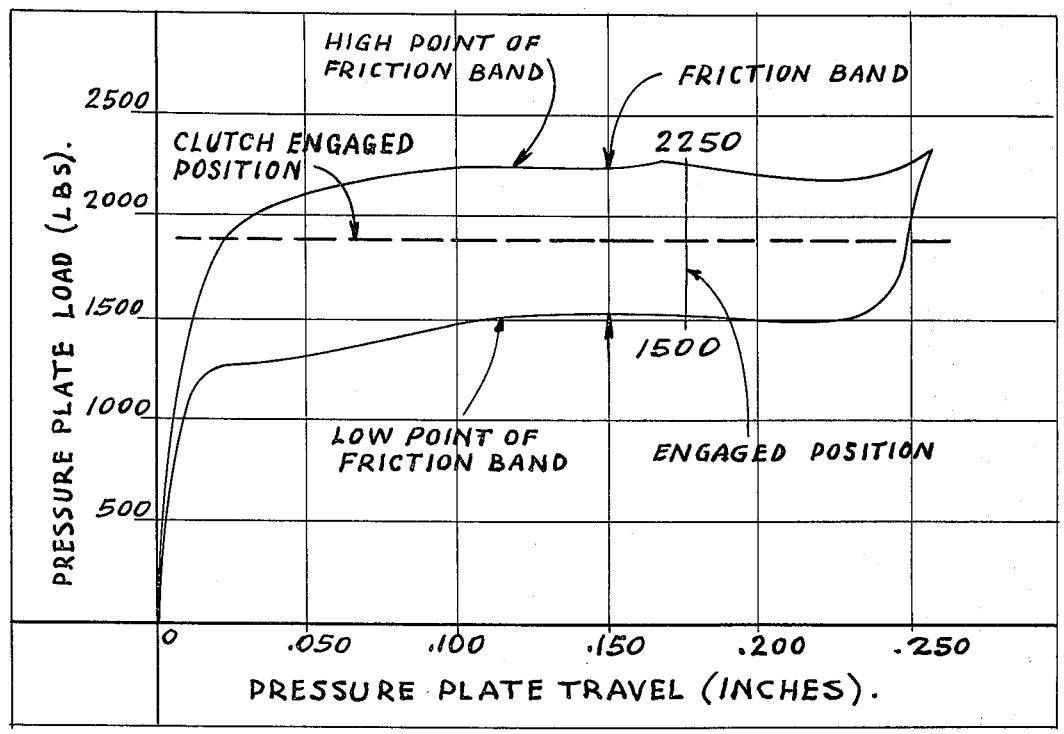
FIG-4-
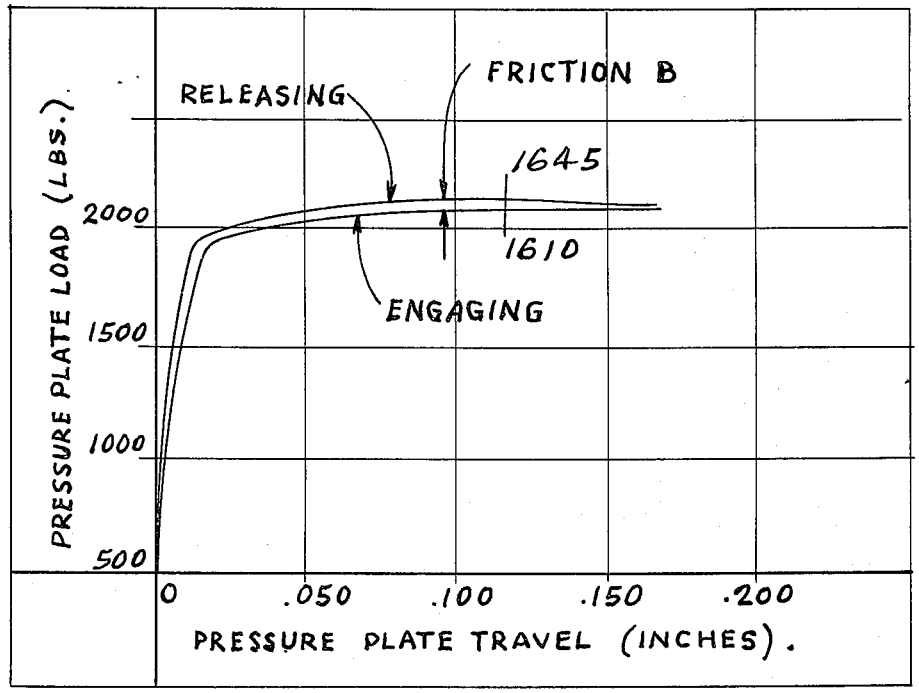
FIG-5-

CLUTCH LEVER WITH LOW FRICTION PIVOT

BACKGROUND OF THE INVENTION

1. Field of the Invention.

This invention relates generally to friction clutches and more particularly to an improved lever system for clutches of this type.

2. Description of the Prior Art.

Clutches of the above type utilize levers pivotally mounted with respect to a clutch cover for applying an operative force to a clutch pressure plate in order to operate the clutch. While this general type of clutch has been used successfully in the past, due to increasing load application, it is becoming more and more of a problem to provide a satisfactory and economical bearing surface for the levers so that the least possible amount of friction is present between the engaging surfaces of the lever and pivot pin. Typically, in devices of this type, a plurality of release levers extend radially with the inner ends of the levers adapted to be actuated as a group by a clutch collar. An intermediate portion of the levers are pivotally connected by a round pivot pin which is secured in a clutch cover with the cover in turn being fixed to and rotatable with a flywheel. The outer or working ends of the levers are connected to a pressure plate so that upon pivoting of the levers about the pivot pins, the lever outer ends serve to apply a force to the pressure plate causing disengagement of the clutch.

In the above type of construction, a definite disadvantage exists insofar as friction is concerned when utilizing a fixed pivot pin of round configuration inasmuch as the mounting portion of the levers actually engage the entire circumferential surface of the pivot pin. As the levers pivot between the clutch engaged and disengaged positions, considerable rubbing friction is produced reducing the operational life of the clutch construction and requiring increased pedal pressure to disengage the clutch.

While attempts have been made in the past to remedy this problem by incorporating a knife-edge type of construction for cooperating with the lever for the purpose of establishing substantially reduced friction free pivotal connection between the lever and pivot pin, thus far, the proposed designs have been complicated and additionally have not produced a true knife-edge construction, i.e., point-to-point contact.

One such arrangement is shown in U.S. Pat. No. 2,727,612. This patent discloses in FIG. 3 a construction which has been referred to as a knife-edge pivot pin for use with a clutch release lever. The knife-edge, however, is lacking in two respects. First, the bearing portion of the knife-edge is not a sharp edge but was constructed as a rounded bearing surface. Secondly, the so-called knife-edge is limited to contact with a similar rounded bearing portion provided on the lever itself.

The lever assembly of the present invention has overcome the above problems by providing an improved pivot pin constructed with a longitudinally extending knife-edge adapted to engage across substantially an entire surface of a flat bearing face provided on the release levers.

Accordingly, one of the objects of the present invention is to provide a knife-edge design having true line contact and also greater contact area between the knife-edge on the pivot pin and clutch release lever than heretofore possible.

It is another object of the present invention to improve the operation of such a clutch by providing a pivot pin for engaging a release lever in substantial line contact whereby friction between the members is reduced to a minimum.

Another object of this invention is to provide integral means on a release lever and cooperating pivot pin whereby the means responds to restrain the release levers against radially outward movement during operation of the clutch resulting from centrifugal force.

BRIEF DESCRIPTION OF THE DRAWINGS

In the drawings:

FIG. 3 is a partial view similar to FIG. 2 showing the parts positioned with the clutch in its disengaged position;

FIG. 4 is a graph depicting load vs. deflection in a clutch using a conventional roll type pivot pin;

FIG. 5 is a graph similar to FIG. 4 showing the results of the knife-edge pivot pin of this invention;

FIG. 6 is a plan of the release levers of the present invention;

FIG. 7 is a section view of the lever shown in FIG. 6 taken along lines 7—7;

FIG. 8 is a front elevational view of the pivot pin of the present invention; and FIG. 9 is an end view of the pivot pin of FIG. 8 as viewed from the right.

DESCRIPTION OF THE PREFERRED EMBODIMENT

Figure 1:
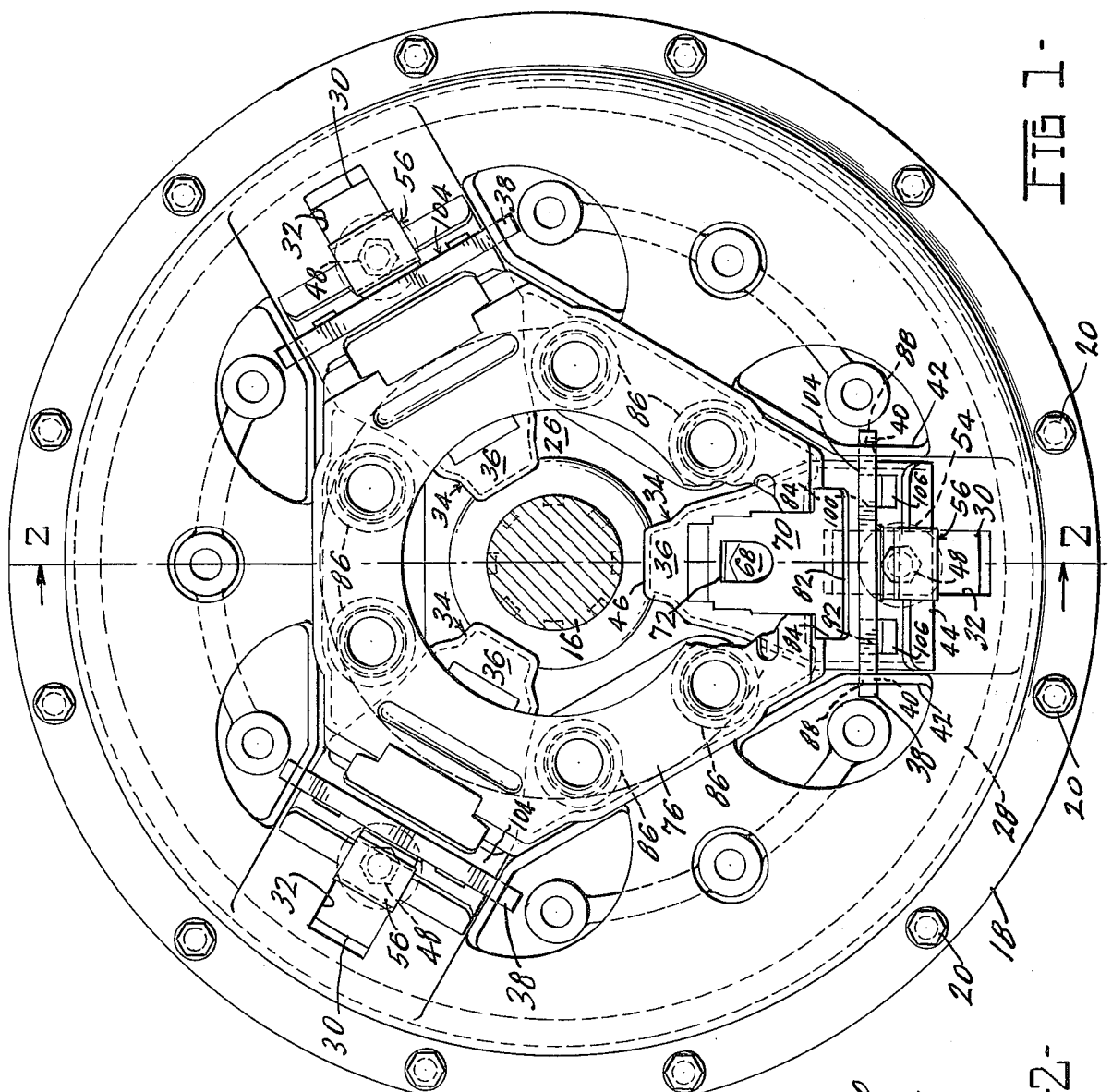
FIG. 1 is an end view of the clutch of the present invention looking from the output shaft end with portions broken away for clarity.
Figure 2:
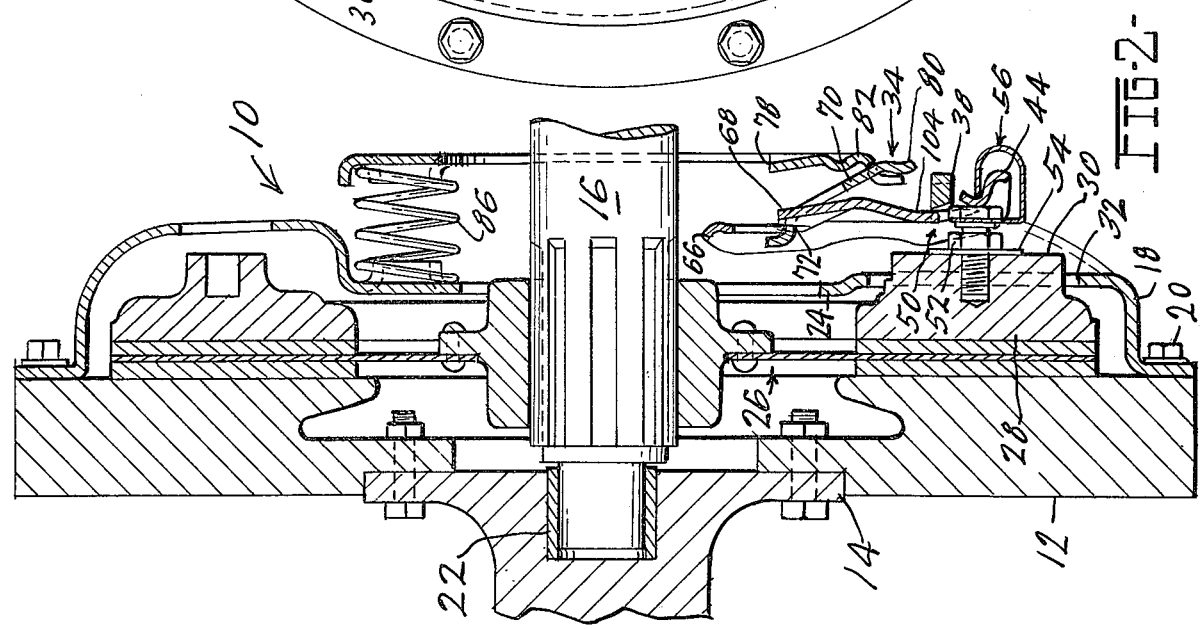
FIG. 2 is a side elevational view taken along line 2—2 of FIG. 1 with the clutch shown in its normally engaged position.

Referring now to the drawings and more particularly to FIGS. 1 and 2, a spring-loaded friction type clutch is shown generally at 10 drivingly connected to a rotatable flywheel 12 for unitary rotation therewith. The flywheel 12 constitutes the driving element and is mounted in the usual manner on the rear end of an engine crankshaft 14 which is operatively connected to a prime mover (not shown) such as an internal combustion engine or the like. The driven element includes an output shaft 16 adapted to extend rearwardly into the gear box of a transmission (not shown). The clutch 10 is provided to establish a driving connection between the flywheel 12 and the output shaft 16.

More particularly, the clutch 10 includes a bracket or clutch cover 18 secured to the outer peripheral portion of the flywheel 12 by a series of bolts 20 so that the bracket 18 and flywheel 12 rotate in unison. Thus, the flywheel 12 and bracket 18 together constitute a housing for the clutch parts enclosed therein and together may be considered a driving means of the clutch.

The driven or output shaft 16, shown fragmentarily, is adapted to alternately be declutched from or clutched into driving engagement with the flywheel 12, and, as shown, is piloted at its forward end in the flywheel 12 by a bearing 22 for relatively frictionless rotation relative to the flywheel 12. The output shaft 16 extends axially rearwardly from the bearing 22 so as to project through a circular central opening 24 in the bracket 18.

A friction disc 26 is splined to the forward end of the output shaft 16 so as to be rotatable therewith and axially slidable relative thereto. The friction disc 26 is disposed between the flywheel 12 and a pressure plate 28 in a manner whereby axial actuation of the pressure plate 28 toward the flywheel 12 will afford frictional gripping of the friction disc 26 therebetween for conjoint rotation of the flywheel 12 and output shaft 16. The pressure plate 28 has an annular configuration and includes a plurality of rearwardly and axially extending bosses or drive lugs 30 formed adjacent its outer peripheral edge for registering with suitable slots 32 formed in the bracket 18. Thus, the drive lugs 30 serve to transmit drive from the bracket 18 to the pressure plate 28.

A lever assembly, indicated generally by the reference numeral 34, is provided for cooperating with the pressure plate 28 for effecting clutch engagement. The lever assembly includes a plurality of circumferentially arranged clutch release levers 36, each disposed in a radial direction. Each release lever 36 is pivoted intermediate its ends to the bracket 18 by means of a novel knife-edge pivot pin 38. The pivot pins 38 are rigidly held with respect to the bracket 18 by engagement of its outer ends with suitable openings 40—40 provided in spaced opposed raised mounting flanges 42—42. The flanges 42—42 are formed as an integral part of the bracket 18 and extend axially rearwardly therefrom so that suitable mounting means is provided for each release lever 36. The manner and method of assembly of the pivot pin 38 with respect to the bracket 18 will be described in greater detail later. With respect to the radially outermost ends 44 of each clutch lever 36, as best seen in FIG. 2, the ends are generally relieved in cross section and serve to provide an offset engaging portion 46. This portion 46 is adapted to act against a head 48 of a series of set screws 50 threadedly retained in the drive lugs 30 of the pressure plate 28. Each screw 50 is adjustable in an axial direction and fixed in its adjusted position by means of a nut 52 and lockwasher 54 seated flush with the rearward face of the drive lug 30.

A spring clip means 56 connects the head 48 of each of the screws 50 to the radially outer ends 44 of the clutch levers 36. More particularly, spring clip 56 is generally L-shaped with a leg 58 thereof being the attaching portion and having a slot for engaging the screws 50. A second leg 60 of clip 56 extends outwardly parallel to the screw 50 and has a hook-shaped end portion 62 with an extremity 64 having line fulcrum contact with the hook-shaped outer end portion of the clutch lever 36. This construction is described in more detail in U.S. Pat. No. 3,539,047, issued Nov. 10, 1970, and owned by a common assignee. The spring clip 56 furnishes an anti-rattle characteristic for the pressure plate 28, positive disengagement thereof and easy removal of the spring clip for adjustment of the clutch 10 through the screws 50, if desired. Disengagement of the pressure plate 28 is, of course, provided by a throw out bearing (not shown) acting axially leftwardly against the radial inner ends 66 of each of the clutch levers 36.

Means are provided to urge the clutch levers 36 and thereby the pressure plate 28 constantly towards engagement with the flywheel 12. To this end, angled links 70 connect the inner end 66 of the levers 36 to a collector ring 76. The collector ring 76 is triangular in shape and is axially spaced from the bracket 18 with resilient means interposed therebetween reacting to constantly force the collector ring 76 axially away from the bracket 18. The angle links 70 have their inner ends connected to the clutch levers 36 by a tab 68. This tab extends angularly and backwardly from the main portion of the clutch lever 36. The link 70 has a transversely extending aperture 72 adapted to engage the tabs 68 of the clutch levers 36 for connecting the inner ends to the levers 36. A forward end of the link 70 is radially and axially inturned to insure that the respective link 70 and clutch lever 36 remain engaged during operation of the clutch and also provide a knife-edge for pivotal movement of the link 70. Link 70 extends both radially outwardly and axially rearwardly away from the clutch lever 36 so as to be connected angularly to the collector ring 76. A central opening 78 is provided in the collector ring 76 for passage therethrough of the output shaft 16.

In order to connect the rearwardly extending end of the link 70 to the collector ring 76, the outer and rearward end of the link 70 is provided with an angled end 80 that is bent so as to extend radially outwardly and forwardly towards the clutch lever 36. The angled end 80 is inserted and held within a transversely extending slot 82 in the collector ring 76 by abutting against the sides of a pair of notched portions 84 provided on the collector ring 76. This abutting connection insures positive location of the link 70 relative to the collector ring 76 and insures that the collector ring and link will remain in assembled condition during operation of the clutch 10 and further provides a knife-edge for pivotal movement of the link 70.

Radially opposite each of the links 70 and as stated before, mounted between the collector ring 76 and clutch bracket 18, is the resilient means which reacts to force the collector ring 76 axially away from the clutch bracket 18. More particularly, the resilient means is in the form of pairs of compression springs 86 which react on the inner ends 66 of the levers 36 through the collector ring 76 and links 70 to hold the clutch 10 in a normally engaged position. Thus, the collector ring 76 serves to transfer the engaging force of the compression springs 86 to the levers 36 through the series of angle links 70.

From the description thus far, it can be seen that the links 70 act against the clutch levers 36 in an axial rearward direction by being urged in this direction by the expanding force of the springs 86 acting against the collector ring 76 in a similar direction. Thus, the collector ring 76 pulls the links 70 in the rearward axial direction. Because the series of these links are spaced equidistantly (120° apart) and because the spring means 86 are also so spaced, it is apparent that the collector ring 76 moves axially parallel as the springs 86 expand and compress during movement between engaged, disengaged and full wear position. It should also be apparent that the link 70 pivots relative to the clutch levers 36 during movement of the pressure plate 28 between the aforementioned positions so that the action force acting against the clutch levers 36 and available as clutching pressure for the pressure plate 28 is both a function of the relative compression of springs 86 and the geometry or mechanical advantage afforded by the novel angular relationship of link 70 relative to clutch levers 36.

For further discussion of the details of the above construction, reference can be made to U.S. Pat. No. 3,520,388 issued July 14, 1970, and owned by a common assignee.

LEVER ASSEMBLY

Turning now to the parts which make up the lever assembly 34, and specifically to the pivot pin 38 shown in FIGS. 8 and 9, each pivot pin 38, in accordance with the present invention, is in the form of an elongated pin of rectangular cross section. The pivot pin 38 has a pair of spaced guide slots 88—88 on one of its short sides located adjacent the outer ends. These slots are provided for reception in the rectangular shaped mounting openings 40—40 formed in the rearward mounting flanges 42—42 of the bracket 18. On the opposite short side of the rectangular pin is an angularly disposed surface 90 machined in a manner to form pairs of spaced projecting lugs 92—92 and 92a—92a. The lugs are positioned slightly axially inwardly and opposite of the guide slots 88—88 while the tapered or angular surface 90, as best seen in FIG. 2, is constructed at an angle sufficient in degree to enable the levers 36 to be pivoted their maximum angle without interference with this surface.

The angled or beveled surface is constructed so as to form a sharp longitudinally extending knife-edge 102 running substantially the entire length of the pin 38 being interrupted only at the locations of the lugs 92—92 and 92a—92a. The knife-edge 102 is adapted to engage a flat bearing surface 104 on the release lever 36 along substantially the entire width of the lever 36 as indicated by the line X—X of FIG. 6. The knife-edge 102 engaging along line X—X in point-to-point or line contact whereby friction between the cooperating surfaces is reduced to a bare minimum.

The openings 40—40 formed in the flanges 42—42 of bracket 18 are of a substantially rectangular configuration. The pivot pin 38 is capable of passing freely through these openings 40—40 when the compression springs 86 are loaded. The guide slots 88—88 are relieved for fitting within the openings 40—40 in such a manner that the pivot pin 38 is trapped against rotational movement when rotational force is applied to the levers 36. After being positioned properly within the openings 40—40, so that the notches 88—88 therein align with the flanges 42—42, the springs are unloaded whereby the pivot pins 38 are urged upwardly. This upward movement of the pivot pins 38 enables spaced notches 88—88 on the back short face of the pivot pin 38 to engage and be loaded against the backs of the openings 40—40 so that the pivot pin 38 is rigidly locked or fixed with respect to the bracket 18 when the compression springs 86 are released. The pivot pin 38 is thereby captured by the compression springs 86, eliminating the need to weld or rivet the pivot pin 38 in place in the openings 40—40.

The knife-edge surface 102 of the pivot pin 38 is shown as being interrupted at the two locations intermediate the outer ends of the pin 38 by the lugs 92—92. These lugs 92—92 are adapted to fit within aligned spaced pockets 100—100 provided in the flat bearing surface 104 of the lever 36, to act as guide means for positioning of the lever.

Referring now in greater detail to the levers 36, it can best be seen in FIG. 6 that the lever 36 is somewhat triangular in configuration and is of stamped channel-shaped sheet metal construction. For mounting the levers 36 to the bracket 18, the lever 36 is positioned between the flanges 42—42 in spaced relationship. Adjacent the hook-shaped outer end portion 44 of the lever 36, the flat bearing surface 104 is constructed so as to extend completely across the back face of the lever. Within this flat bearing surface 104, in spaced relation, are the pockets 100—100 which can be punched or formed in such a manner as to provide raised guides 106—106. A third pocket 100a is similarly formed to form a central raised guide 106a. As seen from the side in FIG. 7, these guides 106—106 and 106a as well as the inside surfaces 108—108 of the openings 100—100 are constructed with parallel surface angles to prevent obstruction of the lugs 92—92 in this area as the levers 36 are pivoted to a clutch disengaged position. The guides 106 themselves and their angular position serve, if needed, to cooperate with the adjacent face of the pivot pin 38 to prevent the levers 36 from bottoming out which could result in lever abuse such as, for example, bending or overtravel. Also, these guides 106 further serve to restrict undesirable movement of the levers 36 during shipping and limiting lever travel in a wear position. Further, these guides 106 add an additional safety factor which prevents the lever from moving out of position.

It will be readily apparent when viewing the lever 36 as illustrated in FIG. 6, that the surface 104 engageable by the knife-edge 102 of the pivot pin 38, indicated again by the line X—X, extends across the entire width of the lever 36 and is broken only at the location of the pockets 100—100.

TEST RESULTS

The lever assembly contemplated by this invention has satisfactorily overcome previous problems as indicated by tests which have shown the instant lever assembly to withstand 500,000 cycles of operation with no signs of wear or failure.

The illustrations appearing in FIGS. 4 and 5 graphically depict the results of comparison tests with the results of the test run with a lever system utilizing a conventional round pivot pin, shown in FIG. 4, and a lever system employing the features of the present invention shown in FIG. 5. It will be readily apparent from a comparison of the friction bands resulting from the tests that the assembly utilizing the improved knife-edge design of the present invention has proven to be considerably more satisfactory than that device employing a conventional round pivot pin design.

The graphs are clearly marked with the essential information and it is felt that further discussion of the details is not necessary.

OPERATION

In operation, with the clutch 10 in its engaged position, drive is transmitted from the flywheel 12 to the friction disc 26 by the pressure plate 28 urged tightly against the flywheel 12, the friction disc 26 thus transmitting the drive to the output shaft 16. Rotation of the pressure plate 28 is transmitted simultaneously to bracket 18 by engagement of the drive lugs 30 or the pressure plate 28 with drive slots 32 in the bracket 18.

Disengagement of the clutch 10 occurs when the inner ends 44 of the release levers 36 are moved toward the flywheel 12. This movement causes the levers 36 to pivot about the knife-edge 102 of pivot pins 38 so that the outer ends 44 of the levers 36, by means of the clip 56 and bolt 50, will carry the pressure plate 20 away from the flywheel 12 to disengage the clutch 10 against the force of the compression springs 86.

When pressure is removed from the inner ends 66 of the levers 36, the compression springs 86 are in a position to react to restore engagement of the pressure plate 28 with the friction disc 26 and flywheel 12 thereby re-establishing the drive connection between the flywheel and output shaft 16.

During the clutch disengaging operation, it will be apparent that as levers 36 pivot about the knife-edge 102 of the pivot pin 38, a very low release effort is present due to the elimination of any rubbing contact between the engaging surfaces. Also, as the levers 36 are pivoted about the knife-edge 102, it can be seen that the lugs 92—92 of the pivot pin 38 will move freely within the openings 100—100 in the lever. In addition, during lever movement, the guides 106 on the levers 36 will assure proper positioning of the levers under all conditions of operation.

Accordingly, it can be seen that in the present invention a true knife-edge design has been provided that is point-to-point contact by means of the sharp edge 102 engaging the flat bearing surface 104. Thus, the present design has improved on known designs by increasing the amount of knife-edge surface contact to a greater degree by utilizing substantially the full length of the pivot pin.

Another significant feature in the present invention is the simple and positive restraint means provided for the release levers to reduce the centrifugal effect of the levers during clutch operation.

Although the present invention has been described in connection with a spring-loaded friction clutch of the type disclosed in U.S. Pat. No. 3,520,388 it should be apparent that the principles of the invention could be provided in differing types of clutches. The scope of the invention is, therefore, not to be limited by the example given but is to be assessed as defined and limited by the appended claims.

What we claim is:

1. An improvement in a clutch having a central axis and including: a drive member; a clutch cover; a driven member; a pressure plate disposed adjacent the driven member and adapted to be moved axially into and out of engagement with the driven member; means for urging the pressure plate into engagement with the driven member; lever means pivotally connected to said cover for moving said pressure plate into and out of engagement with the driven member; the improvement in said clutch comprising: fixed pivot means carried on said cover and having a pivot axis, said pivot means including a sharp knife-edge on said pivot axis and at least one integral lug having a radially inward axially extending surface extending therefrom parallel to the axis of said clutch the plane of said surface including said pivot axis, said lever connected to said pressure plate and including a flat bearing surface engaging said knife-edge on said pivot means, at least one opening in said bearing surface having spaced inner and outer edges, said lug on said pivot means extending into said opening on said lever, and said inwardly directed surface of said lug engaging said inner edge of said opening to thereby define coacting restraint means along said pivot axis constantly engageable for preventing relative sliding movement between said pivot means and lever.

2. An improvement in a clutch according to claim 1 wherein said pivot means is a longitudinally extending pin having end portions retained on said cover.

3. An improvement in a clutch according to claim 1 wherein said pivot means comprises a fixed rectangular pin having an interrupted angular surface defining a longitudinally extending knife-edge and a pair of spaced lugs, said flat bearing surface on said lever including a pair of spaced openings for receiving said lugs and said inner edge of said openings having an angular surface defining a sharp knife-edge engaging said inwardly directed surface on said lugs along said pivot axis on said pivot pin to form a continuous knife-edge engagement.

4. An improvement in a clutch according to claim 3 wherein said angular surface on said pin slopes radially outwardly and axially from said lever, and said angular surface on said lever slopes radially inwardly and axially from said inwardly directed surface on said pivot pin.

5. An improvement in a clutch according to claim 1 wherein said outer edge of said opening in said lever has integral guide portions engageable with said pivot means for limiting pivotal movement of said lever with respect to said pivot means.

* * * * *